United States Patent
Li et al.

(10) Patent No.: US 11,882,028 B2
(45) Date of Patent: Jan. 23, 2024

(54) PACKET SENDING METHOD IN DISTRIBUTED ROUTER NETWORKING, DEVICE, AND SYSTEM

(71) Applicant: Huawei Technologies Co., Ltd., Shenzhen (CN)

(72) Inventors: Ximing Li, Shenzhen (CN); Qingfeng Xue, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 65 days.

(21) Appl. No.: 17/651,995

(22) Filed: Feb. 22, 2022

(65) Prior Publication Data

US 2022/0182316 A1    Jun. 9, 2022

Related U.S. Application Data

(63) Continuation of application No. PCT/CN2020/112162, filed on Aug. 28, 2020.

(30) Foreign Application Priority Data

Aug. 30, 2019    (CN) .......................... 201910818534.8

(51) Int. Cl.
*H04L 45/02* (2022.01)
*H04L 45/12* (2022.01)
(Continued)

(52) U.S. Cl.
CPC .............. *H04L 45/42* (2013.01); *H04L 45/02* (2013.01); *H04L 45/123* (2013.01); *H04L 45/44* (2013.01); *H04L 45/74* (2013.01); *H04L 47/125* (2013.01)

(58) Field of Classification Search
CPC ....... H04L 45/02; H04L 45/123; H04L 45/44; H04L 47/125
See application file for complete search history.

(56) References Cited

U.S. PATENT DOCUMENTS

| | | | |
|---|---|---|---|
| 6,980,521 B1 | 12/2005 | Jarvis | |
| 2005/0025051 A1* | 2/2005 | Roeder | H04L 61/00 370/230 |

(Continued)

FOREIGN PATENT DOCUMENTS

| | | |
|---|---|---|
| CN | 1520110 A | 8/2004 |
| CN | 1738291 A | 2/2006 |

(Continued)

OTHER PUBLICATIONS

Di, X. et al., "Energy-Efficiency of Load-Balancing Routine for Wireless Convergecast Networks: Centralized versus Distributed Implementation", International Wireless Communications and Mobile Computing Conference (IWCMC), IEEE, XP033225380, Aug. 24, 2015, 6 Pages.

*Primary Examiner* — Abdulkader M Alriyashi
(74) *Attorney, Agent, or Firm* — Slater Matsil, LLP

(57) ABSTRACT

A packet sending method in distributed router networking, a device, and a system are disclosed, and relate to the field of network communication technologies. The distributed router networking includes at least two routers, the at least two routers are located in a same local area network, and each router has a capability of communicating with an external network. After receiving a packet, any router in the local area network may distribute the packet to the plurality of routers in the local area network according to a packet load balancing rule, and the plurality of routers distribute the packet to the external network.

20 Claims, 11 Drawing Sheets

(51) Int. Cl.
*H04L 47/125* (2022.01)
*H04L 45/42* (2022.01)
*H04L 45/74* (2022.01)
*H04L 45/44* (2022.01)

(56) References Cited

U.S. PATENT DOCUMENTS

2006/0101157 A1   5/2006   Eardley
2012/0092997 A1   4/2012   Mihaly et al.
2019/0335525 A1*  10/2019  Liu .......................... H04L 45/48
2020/0295835 A1*  9/2020   Cooper ................. H04B 10/27

FOREIGN PATENT DOCUMENTS

| CN | 101652968 A | 2/2010 |
| CN | 103596290 A | 2/2014 |
| CN | 104219727 A | 12/2014 |
| CN | 108712345 A | 10/2018 |
| CN | 110061898 A | 7/2019 |
| CN | 110620683 A | 12/2019 |
| EP | 2658192 A1 | 10/2013 |
| WO | 2017201750 A1 | 11/2017 |

* cited by examiner

PACKET SENDING METHOD IN DISTRIBUTED ROUTER NETWORKING, DEVICE, AND SYSTEM

CROSS-REFERENCE TO RELATED APPLICATIONS

This application is a continuation of International Patent Application No. PCT/CN2020/112162 filed on Aug. 28, 2020, which claims priority to Chinese Patent Application No. 201910818534.8, filed on Aug. 30, 2019. The disclosures of the aforementioned applications are hereby incorporated by reference in their entireties.

TECHNICAL FIELD

Embodiments of this application relate to the field of network communication technologies, and in particular, to a packet sending method in distributed router networking, a device, and a system.

BACKGROUND

With the development of Internet of Things technologies, home devices are becoming more intelligent and networked. In a smart home system, more home devices are connected, such as security monitoring devices, smart curtains, smart lights, smart speakers, smart TVs, and smart air conditioners. There may be dozens of home devices in a smart home system. In addition, with the popularization of high-definition videos, virtual reality, augmented reality, and live broadcast technologies, a high bandwidth is required to ensure a user's superior viewing experience on a home device.

The sharp increase in the quantity of home devices and the requirement for the high bandwidth of some home devices impose a high requirement for coverage and a bandwidth of a network signal of the smart home system.

Due to blocking of objects such as furniture and walls in a home environment, a single router usually cannot implement full coverage of the network signal of the smart home system. Therefore, distributed router networking is gradually popularized. Distributed networking of a plurality of routers can implement the full coverage of the network signal in the smart home system, and resolve a coverage problem of the network signal.

In a current distributed router networking solution, a plurality of routers form a local area network. A home device connected to any router in the local area network communicates with an external network through a router capable of connecting to the external network, and a single home device can use a bandwidth of only one router. This cannot implement bandwidth aggregation of the plurality of routers, and cannot meet a requirement for a high bandwidth of the home device.

SUMMARY

Embodiments of this application provide a packet sending method in distributed router networking, a device, and a system, to implement bandwidth aggregation of a plurality of routers in distributed networking of the plurality of routers, and improve an overall bandwidth of an entire network of a smart home system.

According to a first aspect, an embodiment of this application provides a packet sending method in distributed router networking, where the distributed router networking includes at least two routers, the at least two routers are located in a same local area network, and each router has a capability of communicating with an external network. The packet sending method includes: A first router receives a packet, and sends the received packet to a destination router according to a packet load balancing rule, where the first router is any one of the at least two routers. The destination router includes the first router or a second router, or the destination router includes the first router and the second router. The second router is a neighboring node router of the first router, and the neighboring node router of the first router is a router directly connected to the first router.

In this method, after receiving a packet, any router in the local area network may distribute the packet to a plurality of routers in the local area network according to a packet load balancing rule, and the plurality of routers distribute the packet to the external network. This can implement bandwidth aggregation of a plurality of routers in the distributed router networking, and improve an overall bandwidth of an entire network of a smart home system.

With reference to the first aspect, in a possible design manner, the first router obtains topology information and uplink statuses of all the routers in the local area network, and determines the packet load balancing rule on the first router based on the topology information and the uplink statuses of the at least two routers. The topology information is used to indicate a connection relationship between a router and another router in the local area network, and the uplink status is a status of an uplink between the router and the external network.

With reference to the first aspect, in a possible design manner, the first router determines a quantity M of neighboring nodes of the first router and a quantity $N_i$ of reachable nodes of the $i^{th}$ neighboring node based on the topology information and the uplink statuses of the at least two routers, and determines that the packet load balancing rule is: The first router sends $1/(N_1+N_2+ \ldots N_i+ \ldots N_{M+1})$ of the packet received by the first router to the external network; and the first router sends $N_i/(N_1+N_2+ \ldots N_i+ \ldots N_{M+1})$ of the packet received by the first router to the $i^{th}$ neighboring node, where $M>0$, $M \geq i > 0$, and $N_i > 0$.

In this method, packets are accordingly distributed to a neighboring node based on a quantity of reachable nodes of the neighboring node. In this way, the packets can be balanced among the plurality of routers in the local area network.

With reference to the first aspect, in a possible design manner, if the packet received by the first router is from a third router, the third router is not included in the neighboring nodes of the first router. The third router is a second router. That is, a packet received by the first router from a neighboring node cannot be distributed to the neighboring node, to avoid a loop.

With reference to the first aspect, in a possible design manner, that a first router sends the received packet to a destination router according to a packet load balancing rule includes: The first router sends the received packet to the destination router based on a session according to the packet load balancing rule; or the first router sends the received packet to the destination router based on a destination IP address of a packet according to the packet load balancing rule.

With reference to the first aspect, in a possible design manner, the packet received by the first router includes a first packet and a second packet, and the first router separately determines a packet load balancing rule on the first router for the first packet and the second packet. The first packet is a packet received by the first router from a terminal device that is connected to the first router, and the second packet is a packet received by the first router from a neighboring node of the first router.

With reference to the first aspect, in a possible design manner, if the received packet is the second packet, and a quantity of forwarding hops of the second packet between the routers in the local area network is greater than or equal to a first preset value, the destination router is the first router. That is, a quantity of forwarding hops of the packet between the routers cannot exceed a preset value, to avoid a large packet sending delay caused by an excessive quantity of times of packet forwarding.

With reference to the first aspect, in a possible design manner, if the received packet is a packet of a delay-sensitive service, the destination router is the first router. In this method, the packet of the delay-sensitive service is not load-balanced between the routers, but is directly sent to the external network by the router that receives the packet, to avoid a delay caused by packet forwarding.

With reference to the first aspect, in a possible design manner, if the destination router includes the first router, the first router sends the packet to the external network. That is, any router in the local area network can directly communicate with the external network.

With reference to the first aspect, in a possible design manner, the local area network is in a tree networking form, a mesh networking form, a star networking form, or a chain networking form.

According to a second aspect, an embodiment of this application provides a router. The router may implement the packet sending method in distributed router networking according to the first aspect. The foregoing method may be implemented by using software, hardware, or hardware executing corresponding software. In a possible design, the router may include a processor and a memory. The processor is configured to support the router in performing a corresponding function in the method according to the first aspect. The memory is configured to be coupled to the processor, and stores program instructions and data that are necessary for the router.

According to a third aspect, an embodiment of this application provides a computer storage medium, where the computer storage medium includes computer instructions, and when the computer instructions are run on a router, the router is enabled to perform the packet sending method in distributed router networking according to any one of the foregoing aspects and the possible design manners of the foregoing aspects.

According to a fourth aspect, an embodiment of this application provides a computer program product. When the computer program product runs on a computer, the computer is enabled to perform the packet sending method in distributed router networking according to any one of the foregoing aspects and the possible design manners of the foregoing aspects.

For technical effects brought by the router according to the second aspect, the computer storage medium according to the third aspect, and the computer program product according to the fourth aspect, refer to technical effects brought by the first aspect and different design manners. Details are not described herein again.

DETAILED DESCRIPTION OF ILLUSTRATIVE EMBODIMENTS

In a distributed router networking solution, a plurality of routers form a local area network, and provide a unified service set identifier (SSID) for the external. A terminal device within a signal coverage area of the local area network may be connected to any router in the local area network. For example, the terminal device may select to be connected to a router with a strongest signal in the local area network. The terminal device may also roam between the routers to switch the connected router.

Distributed routers are networked in a plurality of networking forms. For example, the distributed routers may be networked in various forms such as a tree networking form, a mesh networking form, a star networking form, and a chain networking form.

Figure 1A:
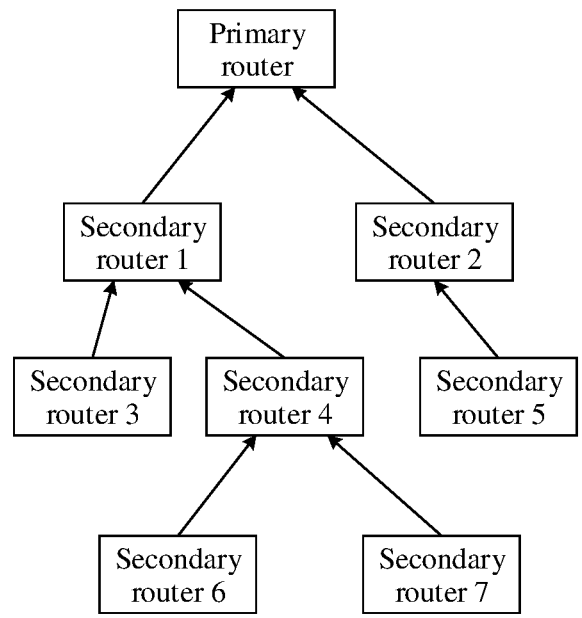
FIG. 1A is a schematic diagram of an architecture of a local area network in a tree networking form of distributed routers.

FIG. 1A shows a tree networking form of distributed routers. In the tree networking form, a plurality of routers in a local area network include a primary router, and the primary router is a root node (level-1 node). Secondary routers are connected to the primary router in a wired manner or a wireless manner level by level. For example, in FIG. 1A, a secondary router 1 and a secondary router 2 are connected to the primary router, and the secondary router 1 and the secondary router 2 are level-2 nodes. The primary router is a parent node of the secondary router 1 and the secondary router 2, the secondary router 1 and the secondary router 2 are child nodes of the primary router, and the secondary router 1 and the secondary router 2 are brother nodes. A secondary router 3 and a secondary router 4 are connected to the secondary router 1, and the secondary router 3 and the secondary router 4 are level-3 nodes. The secondary router 1 is a parent node of the secondary router 3 and the secondary router 4, the secondary router 3 and the secondary router 4 are child nodes of the router 1, and the secondary router 3 and the secondary router 4 are brother nodes. A router 5 is connected to the secondary router 2, and the secondary router 5 is a level-3 node. The secondary router 2 is a parent node of the secondary router 5, and the secondary router 5 is a child node of the secondary router 2. A secondary router 6 and a secondary router 7 are connected to the secondary router 4, and the secondary router 6 and the secondary router 7 are level-4 nodes. The secondary router 4 is a parent node of the secondary router 6 and the secondary router 7, the secondary router 6 and the secondary router 7 are child nodes of the secondary router 4, and the secondary router 6 and the secondary router 7 are brother nodes.

Figure 1B:
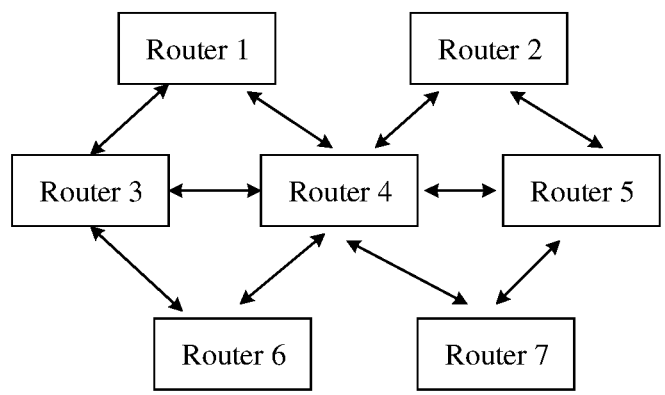
FIG. 1B is a schematic diagram of an architecture of a local area network in a mesh networking form of distributed routers.

FIG. 1B shows a mesh networking form of distributed routers. In the mesh networking form, a plurality of routers in a local area network are fully meshed, and the routers are connected in a wired manner or a wireless manner. A plurality of available paths may exist between any two routers. For example, in FIG. 1B, a router 1, a router 2, a router 3, a router 4, a router 5, a router 6, and a router 7 form a mesh local area network. A plurality of available paths exist between any two routers. For example, the router 6 may communicate with the router 1 through the router 3, may further communicate with the router 1 through the router 4, and may further communicate with the router 2 through the router 4.

Figure 1C:
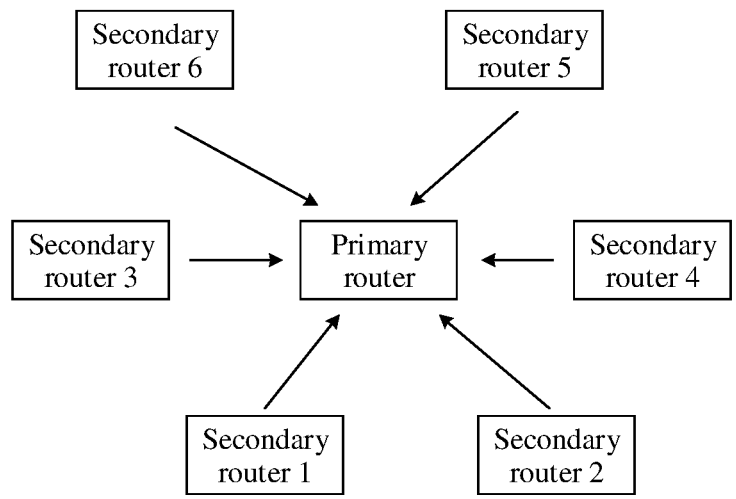
FIG. 1C is a schematic diagram of an architecture of a local area network in a star networking form of distributed routers.

FIG. 1C shows a star networking form of distributed routers. In the star networking form, a plurality of routers in a local area network include one primary router, and a plurality of secondary routers are connected to the primary router in a wired manner or a wireless manner. For example, in FIG. 1C, a secondary router 1, a secondary router 2, a secondary router 3, a secondary router 4, a secondary router 5, and a secondary router 6 are connected to the primary router.

Figure 1D:
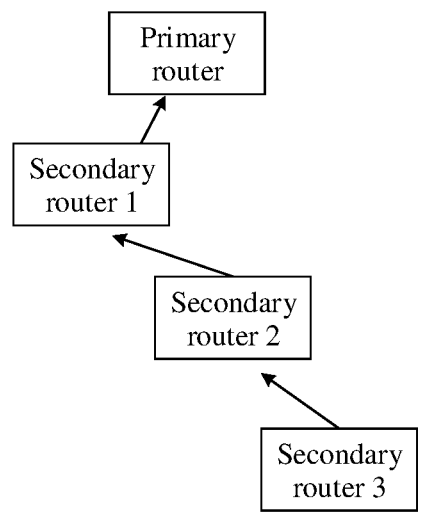
FIG. 1D is a schematic diagram of an architecture of a local area network in a chain networking form of distributed routers.

FIG. 1D shows a chain networking form of distributed routers. In the chain networking form, a plurality of routers in a local area network include a primary router, and secondary routers are connected to the primary router in a wired manner or a wireless manner level by level. Each level includes one router node, and the plurality of routers are connected in a chain manner. For example, in FIG. 1D, a secondary router 1 is connected to the primary router, a secondary router 2 is connected to the secondary router 1, and a secondary router 3 is connected to the secondary router 2.

The wired manner may include power line communication (PLC), Ethernet cable transmission (ETH), and the like. The wireless connection may include a wireless fidelity (Wi-Fi) connection, and the like.

Currently, in a distributed router networking solution, no matter which networking form is used, a terminal device accessing a local area network can communicate with an external network through only one router, and can use a bandwidth of only one router.

Figure 2A:
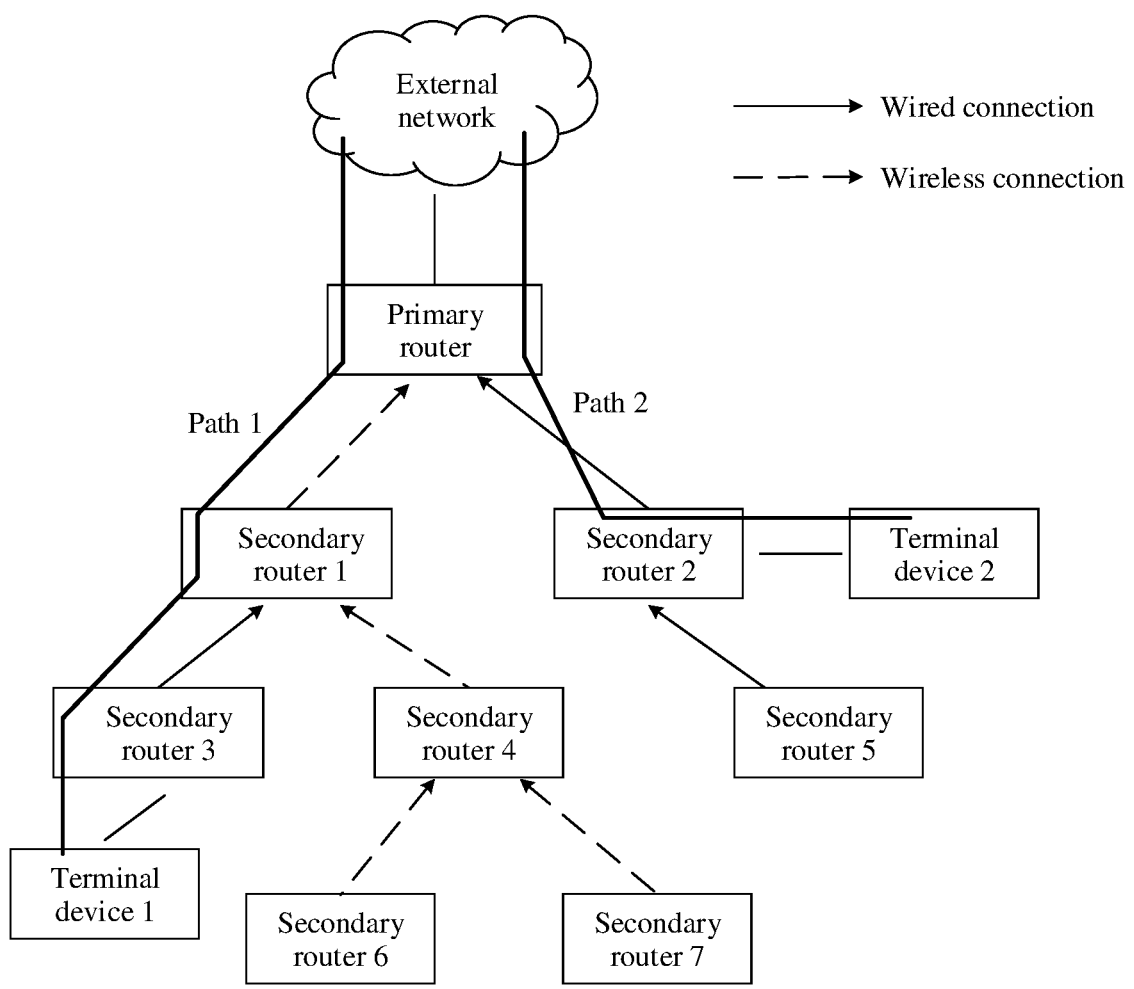
FIG. 2A is a schematic diagram of a packet sending method in a local area network in a tree networking form.

In an example, as shown in FIG. 2A, distributed routers form a local area network in a tree networking form. A primary router is connected to an external network through a wide area network (WAN) interface or a mobile communication interface. Secondary routers are connected to the primary router in a wired manner or a wireless manner level by level. A terminal device connected to any router in the local area network communicates with the external network through the primary router. For example, as shown in FIG. 2A, a terminal device 1 is connected to a secondary router 3, and communicates with the external network along a path 1. A terminal device 2 is connected to a secondary router 2, and communicates with the external network along a path 2.

Figure 2B:
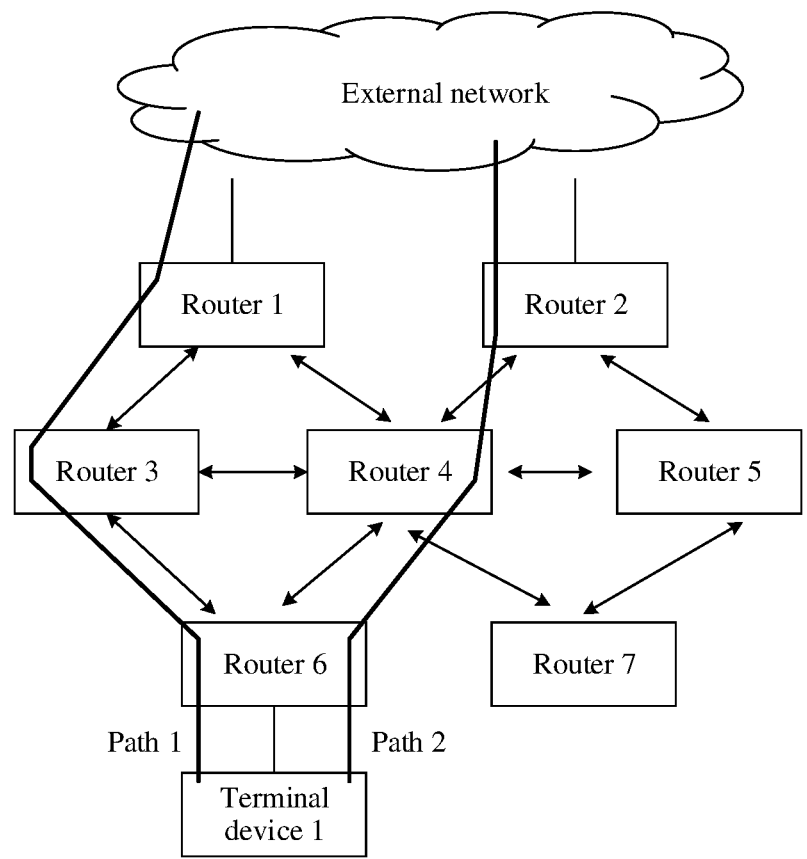
FIG. 2B is a schematic diagram of a packet sending method in a local area network in a mesh networking form.

In another example, as shown in FIG. 2B, distributed routers form a local area network in a mesh networking form. Routers in the local area network may be classified into three roles: a mesh portal point (MPP), a mesh point (MP), and a mesh access point (MAP). Each router in the local area network is an MP, and the MPs may communicate with each other. For example, the MP may support functions such as automatic route discovery and packet forwarding. The MPP can connect the local area network to an external network and communicate with the MPs in the local area network. One local area network may include one or more MPPs. The MAP is an MP that supports an access point (AP) function, and can provide an access function for a terminal device. A terminal device connected to any router in the local area network can communicate with the external network through one MPP each time. For example, as shown in FIG. 2B, a router 1 and a router 2 are two MPPs, and are respectively connected to the local area network and the external network. The terminal device 1 is connected to a router 6, and may communicate with the external network along a path 1 through the router 1. Alternatively, the terminal device 1 may communicate with the external network along a path 2 through the router 2. For example, the terminal device 1 may select a path with better link quality from the path 1 and the path 2. Alternatively, the terminal device 1 may select a path with a smaller quantity of forwarding hops from the path 1 and the path 2. However, in one communication process, the terminal device 1 can communicate with the external network only along the path 1 or the path 2, and cannot communicate with the external network along the two paths at the same time. In other words, the terminal device 1 cannot use bandwidths of two lines at the same time.

An embodiment of this application provides a packet sending method in distributed router networking. The method is performed by routers in the distributed networking, so that a terminal device connected to any router in a local area network can use a bandwidth of each router in the local area network, to implement bandwidth aggregation of a plurality of routers. Distributed routers may be in the foregoing networking forms such as the tree networking form, the mesh networking form, the star networking form, or the chain networking form. Certainly, the distributed routers may also in another networking form. This is not limited in this embodiment of this application.

In this embodiment of this application, each router in the local area network has a capability of communicating with an external network. The routers can be connected to each other in a wired manner or a wireless manner. Each router in the local area network can provide an access function for the terminal device. For example, a router in the distributed networking may be a 4G (4th generation, fourth generation mobile communications) mobile router CPE (customer premise equipment, client device) or a 5G CPE. A subscriber identity module (SIM) card may be inserted in each CPE, and has a capability of accessing the Internet through a mobile network provided by an operator. The CPEs can be connected to each other through PLC, ETH, or Wi-Fi. For another example, a router in the distributed networking may be a broadband router, and each broadband router may be connected to the Internet through a WAN interface of the broadband router. The broadband routers may be connected to each other through a local area network (LAN) interface. For another example, a router in the distributed networking may be mobile Wi-Fi (Mi-Fi). Each Mi-Fi has a capability of accessing the Internet through the mobile network provided by the operator. The Mi-Fis can be connected to each other through Wi-Fi.

Figure 3A:
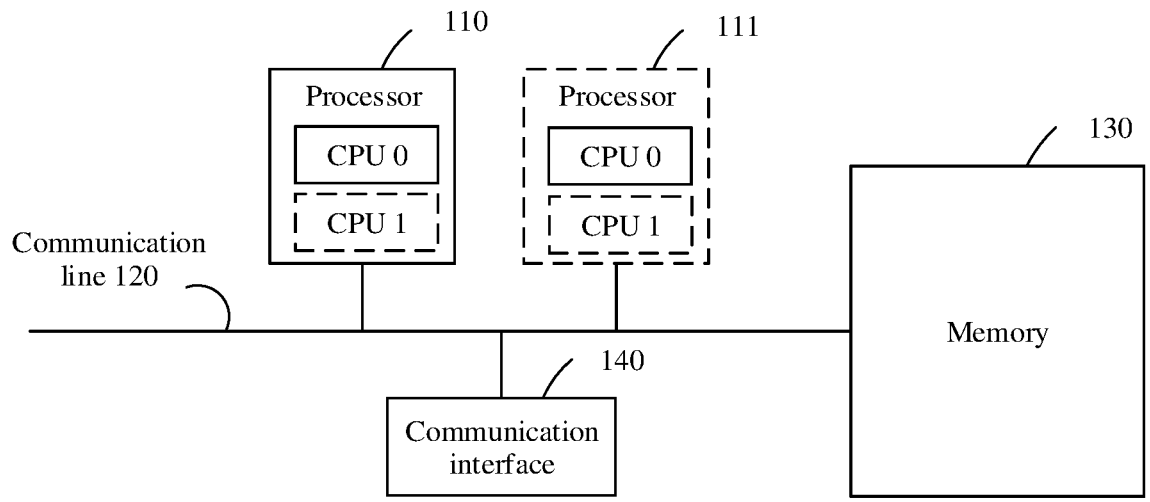
FIG. 3A is a schematic diagram 1 of a structure of a router according to an embodiment of this application.

FIG. 3A is a schematic diagram of a structure of a router 100 according to an embodiment of this application. The router 100 includes at least one processor 110, a communication line 120, a memory 130, and at least one communication interface 140.

The processor 110 may be a general-purpose central processing unit (CPU), a microprocessor, an application-specific integrated circuit (ASIC), or one or more integrated circuits configured to control program execution of solutions of this application.

The communication line 120 may include a path for transmitting information between the foregoing components.

The communication interface 140 is configured to communicate with another device or communication networks such as the Ethernet, a radio access network (RAN), or wireless local area networks (WLAN) by using any apparatus such as a transceiver. For example, the communication interface 140 is configured to communicate with the external network or the terminal device in this application.

The memory 130 may be a read-only memory (ROM) or another type of static storage device that can store static information and instructions, a random access memory (RAM) or another type of dynamic storage device that can store information and instructions, an electrically erasable programmable read-only memory (EEPROM), a compact disc read-only memory (CD-ROM) or another compact disc storage, optical disc storage (including a compressed optical disc, a laser disc, an optical disc, a digital versatile disc, a blue-ray optical disc, and the like), a magnetic disk storage medium or another magnetic storage device, or any other medium that can be configured to carry or store expected program code in a form of instructions or a data structure and that can be accessed by a computer. However, the memory 130 is not limited thereto. The memory 130 may exist independently, and be connected to the processor 110 through the communication line 120. Alternatively, the memory 130 may be integrated with the processor 110.

The memory 130 is configured to store computer-executable instructions for executing the solutions in this application, and the processor 110 controls the execution. The processor 110 is configured to execute the computer-executable instructions stored in the memory 130, to implement the packet sending method in distributed router networking provided in the following embodiments of this application.

Optionally, the computer-executable instructions in this embodiment of this application may also be referred to as application program code. This is not specifically limited in this embodiment of this application.

In specific implementations, in an embodiment, the processor 110 may include one or more CPUs, for example, a CPU 0 and a CPU 1 in FIG. 3A.

In specific implementations, in an embodiment, the router 100 may include a plurality of processors, for example, the processor 110 and a processor 111 shown in FIG. 3A. Each of the processors may be a single-core (single-CPU) processor, or may be a multi-core (multi-CPU) processor. The processor herein may be one or more devices, circuits, and/or processing cores configured to process data (for example, computer program instructions).

The router 100 may be a general-purpose device or a dedicated device. In specific implementations, the router 100 may be a CPE, a broadband router, Mi-Fi, or a device having a structure similar to the structure shown in FIG. 3A. A type of the router 100 is not limited in this embodiment of this application.

Figure 3B:
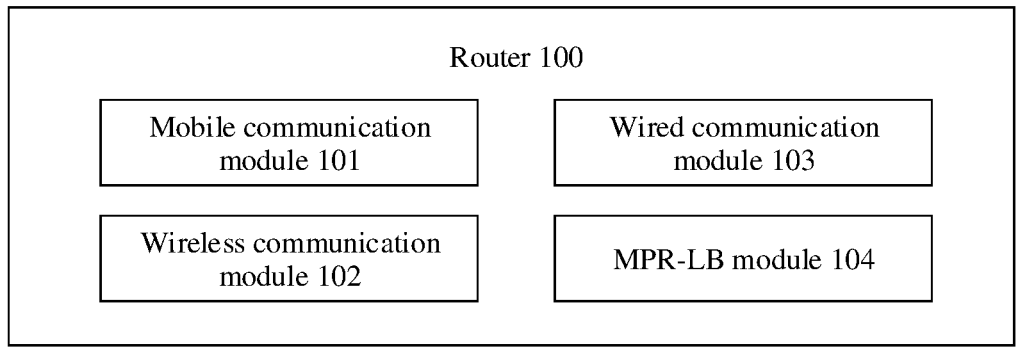
FIG. 3B is a schematic diagram 2 of a structure of a router according to an embodiment of this application.

FIG. 3B is a schematic diagram of another structure of a router 100 according to an embodiment of this application. The router 100 may include a mobile communication module 101, a wireless communication module 102, a wired communication module 103, and a multipoint route-load balance (MPR-LB) module 104.

The mobile communication module 101 provides a mobile communication function for the router 100. The router 100 may be connected to a mobile network through the mobile communication module 101. For example, the mobile network may include a global system for mobile communications (GSM), a general packet radio service (GPRS), code division multiple access (CDMA), wideband code division multiple access (WCDMA), time division multiple access (TD-SCDMA), long term evolution (LTE), new radio (NR), a global navigation satellite system (GNSS), and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The wireless communication module 102 may provide a wireless communication solution that includes wireless local area networks (WLAN) (for example, a wireless fidelity (Wi-Fi) network), and the like and that is applied to the router 100. For example, the wireless communication module 102 may provide a Wi-Fi function for the router 100.

The wired communication module 103 may provide a wired connection function for the router 100. For example, the wired connection may include PLC, ETH, or the like.

The MPR-LB module 104 provides functions such as load balancing and route management on the router 100. According to the local area network including distributed routers provided in this embodiment of this application, each router in the local area network may be connected to an external network. A terminal device connected to any router in the local area network can directly access the external network through a local router (the router to which the terminal device is connected), or can access the external network through another router in the local area network. The router in the local area network may be configured to forward a packet for communication between the locally connected terminal device and the external network, or may be further configured to forward a packet for communication between a terminal device that is connected to another router and the external network. The MPR-LB module 104 may provide load balancing between a plurality of routers 100 for a packet for communication between a terminal device that accesses the local area network and the external network, so that bandwidths of the plurality of routers in the local area network are used in a balanced manner. The MPR-LB module 104 may further provide route management for forwarding, between the routers, the packet for communication between the terminal device and the external network, so that the packet can be forwarded between the plurality of routers.

Figure 4:
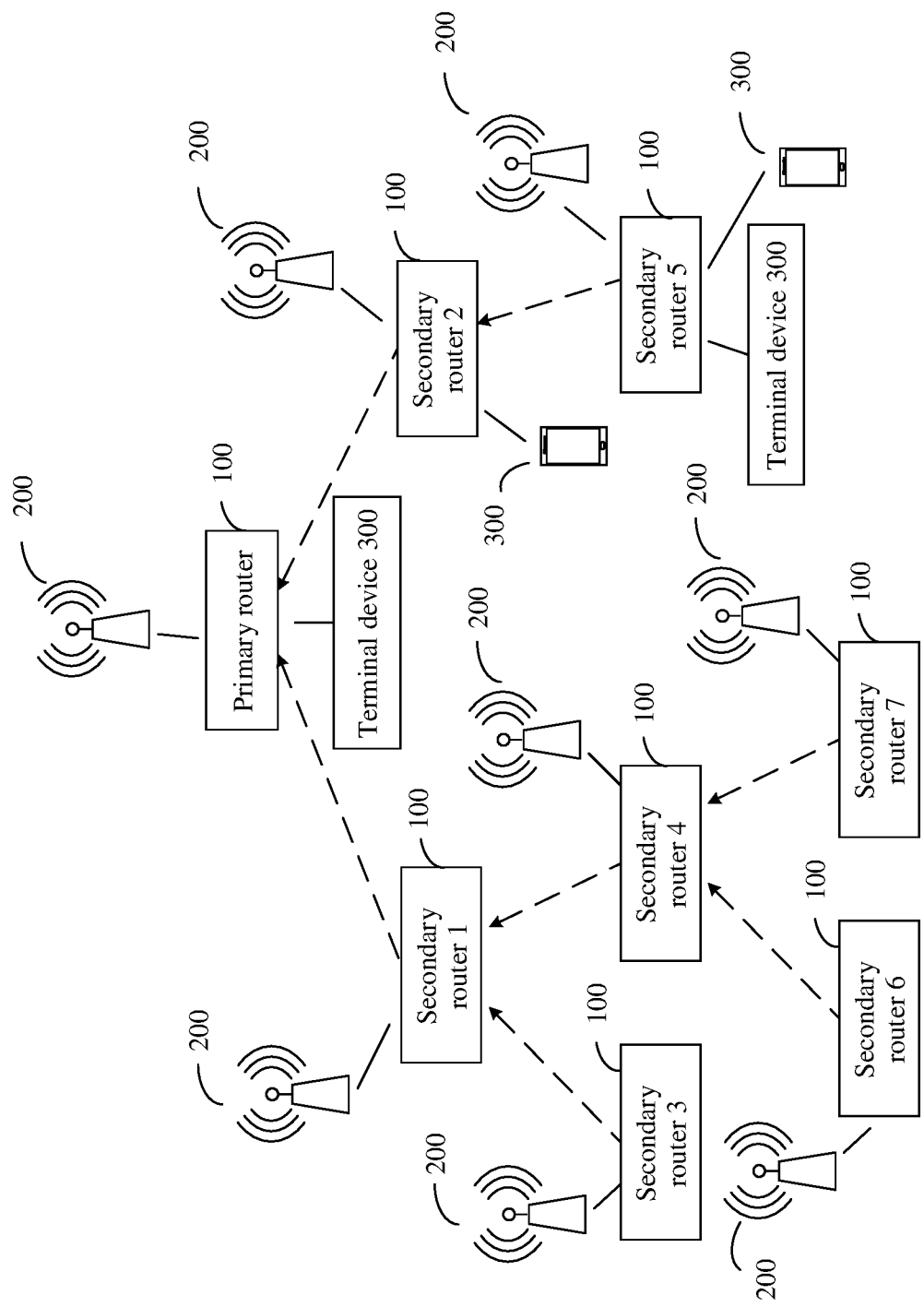
FIG. 4 is a schematic diagram of a system architecture to which a packet sending method in distributed router networking is applicable according to an embodiment of this application.

The packet sending method in distributed router networking provided in this embodiment of this application may be performed by routers in the distributed networking. In an example, as shown in FIG. 4, a plurality of routers 100, such as a primary router, a secondary router 1, a secondary router 2, a secondary router 3, a secondary router 4, a secondary router 5, a secondary router 6, and a secondary router 7 form a local area network in a tree networking form. Each router 100 is connected to one mobile network device 200, may access a mobile network provided by the mobile network device 200, and accesses the Internet through the mobile network. A terminal device 300 connected to a Wi-Fi range of any router 100 may roam between the routers 100.

Figure 5:
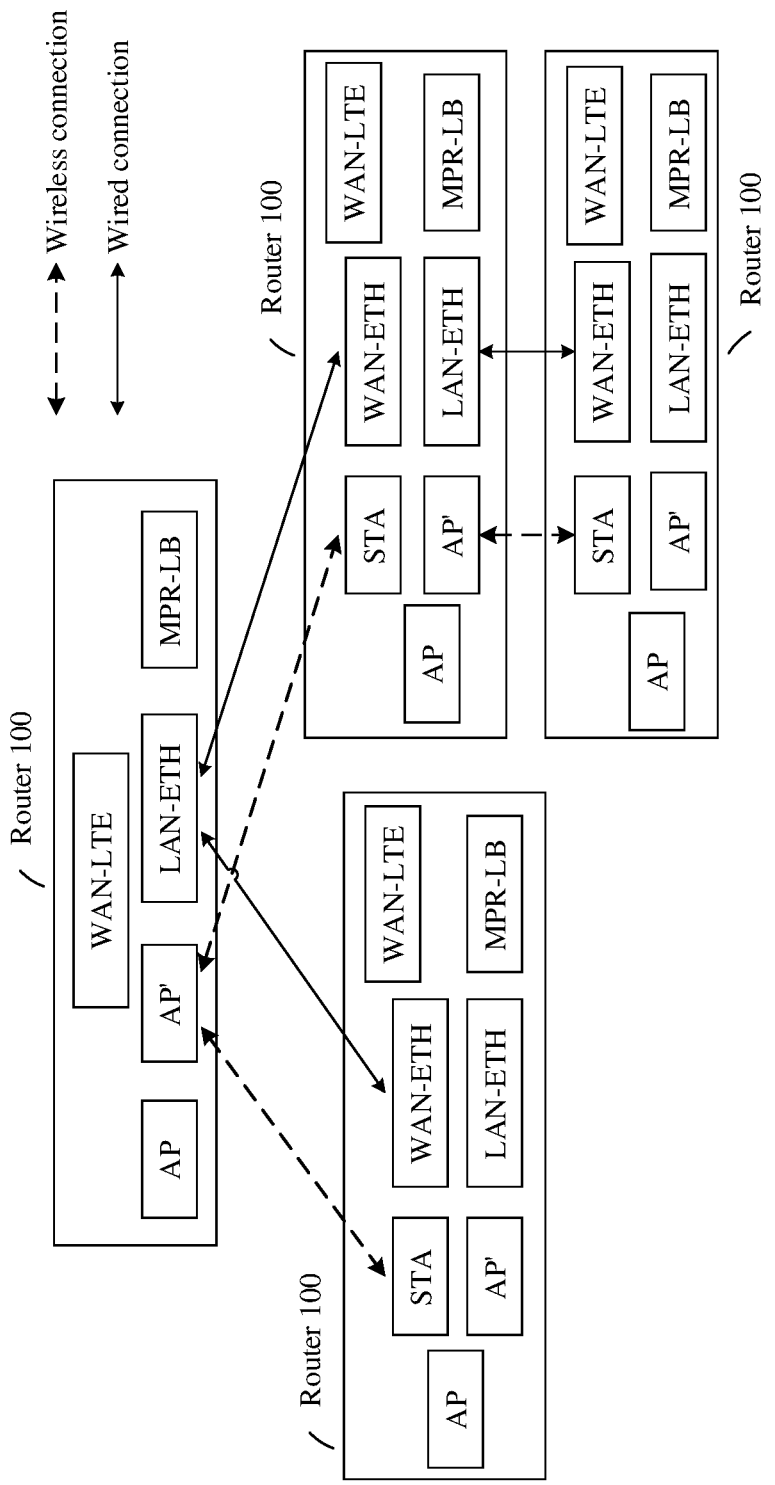
FIG. 5 is a schematic diagram of an architecture of a local area network including routers according to an embodiment of this application.

FIG. 5 illustrates an example in which a plurality of routers 100 form a local area network in a tree networking form according to an embodiment of this application. The router 100 may include modules such as a WAN-LTE module, an AP module, an AP' module, a STA module, a WAN-ETH module, a LAN-ETH module, and an MPR-LB module.

The WAN-LTE module is responsible for a communication function between the router 100 and an external network. For example, the WAN-LTE module may be the mobile communication module 101 in FIG. 3B, and provides an LTE access function for the router 100, to implement communication between the router 100 and an external network (a mobile network). For example, the WAN-LTE module may be the wired communication module 103 in FIG. 3B, and the router 100 communicates with an external network (the Internet) through a wired connection (for example, a WAN port).

The router 100 may implement functions of the access point (access point, AP) module, the AP' module, and the station (station, STA) module by using the Wi-Fi function provided by the wireless communication module 102 in FIG. 3B.

The AP' module provides an access function of a child node for the router 100. The STA module provides a function of accessing a parent node for the router 100. For example, if a STA module of a router A and an AP' module of a router B are connected through Wi-Fi, the router A is used as a child node to be connected to the router B. This can implement a wireless connection between the routers 100.

The AP module provides an access function of a terminal device for the router 100. A terminal device under Wi-Fi coverage of the router 100 may be connected to the router by using the access function provided by the AP module.

The wired communication module 103 in FIG. 3B may provide functions of the WAN-ETH module and the LAN-ETH module in the router 100.

The WAN-ETH module and the LAN-ETH module are wired interfaces of the router 100. The router 100 may be connected to a parent node through the WAN-ETH module, and to a child node through the LAN-ETH module. For example, if the router A establishes an ETH connection to a LAN-ETH module of the router B through the WAN-ETH module, the router A serves as a child node to be connected to the router B. This can implement a wired connection between the routers 100.

The LAN-ETH module may further provide the access function of the terminal device for the router 100. The terminal device may be connected to the router 100 through the LAN-ETH module in a wired manner.

It may be understood that one router wo may be connected to another router in a wireless manner or a wired manner. A plurality of routers in the local area network may be connected to each other in a wireless manner or in a wired manner. Alternatively, some routers in the local area network may be connected to each other in a wireless manner, and some routers in the local area network may be connected to each other in a wired manner.

A packet sending method in distributed router networking provided in an embodiment of this application may be performed by routers in the distributed networking. The following describes in detail the packet sending method in distributed router networking provided in this embodiment of this application by using an example in which routers form a local area network in a tree networking form. It may be understood that the packet sending method in distributed router networking provided in this embodiment of this application may be further used in a local area network in a mesh networking form, a star networking form, a chain networking form, or another networking form. The networking form of a distributed router constitutes no limitation on this embodiment of this application.

Figure 6:
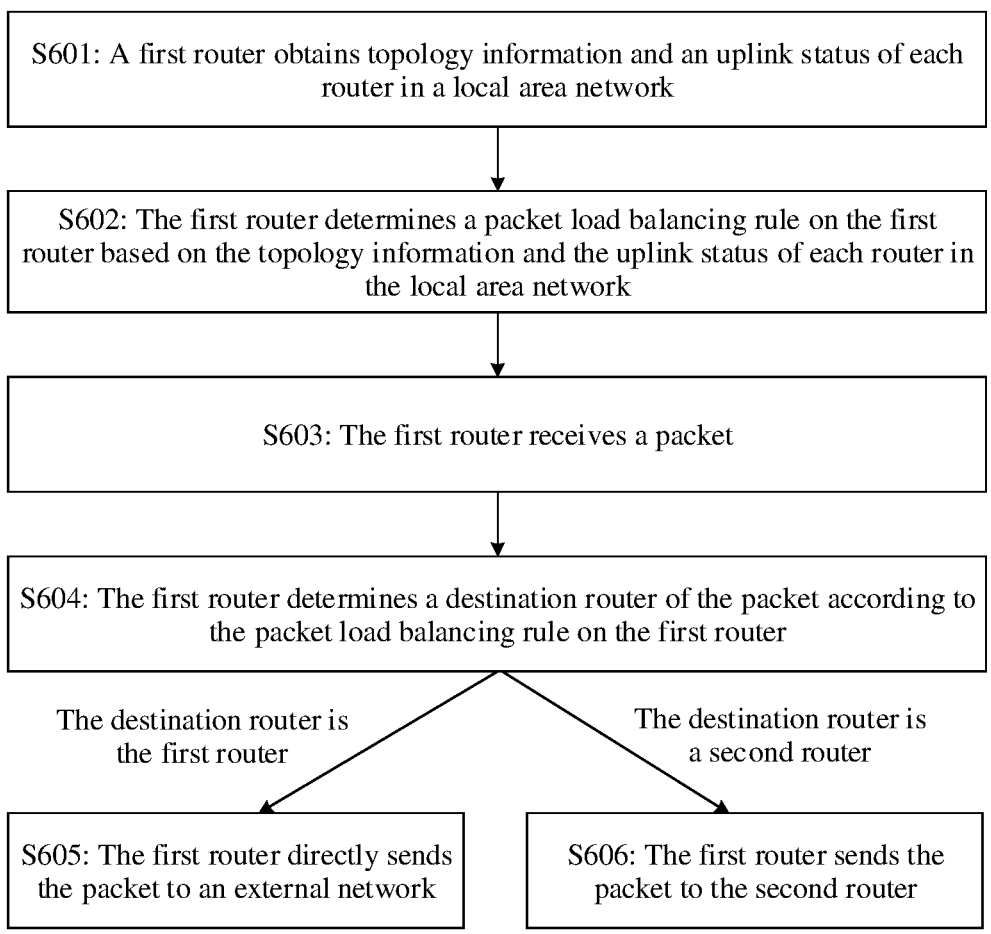
FIG. 6 is a flowchart of a packet sending method in distributed router networking according to an embodiment of this application.

As shown in FIG. 6, a packet sending method in distributed router networking provided in an embodiment of this application may include the following steps.

S601: A first router obtains topology information and an uplink status of each router in a local area network.

The first router is any router in the local area network of distributed router networking.

Each router that accesses the local area network records the topology information of the router. The topology information of the router is used to indicate a connection relationship between the router and another router in the local area network.

A tree networking form is used as an example. The topology information of the router may include a topology status of the router, a parent router identifier of the router, and a child router identifier of the router. The topology status of the router is a location (that is, the router is a level-x node in the local area network) of the router in the local area network.

The local area network in tree networking of distributed routers shown in FIG. 4 is used as an example. The primary router is a level-1 node, the secondary router 1 and the secondary router 2 are level-2 nodes, the secondary router 3, the secondary router 4, and the secondary router 5 are level-3 nodes, and the secondary router 6 and the secondary router 7 are level-4 nodes. For example, a topology status of the secondary router 2 is the level-2 node, a parent router of the secondary router 2 is the primary router, and a child router of the secondary router 2 is the secondary router 5. A topology status of the secondary router 5 is the level-3 node, a parent router of the secondary router 5 is the secondary router 2, and the secondary router 5 has no child router.

The uplink status of the router is a status of an uplink through which the router is connected to an external network. The uplink status of the router may be reachable and unreachable.

Each router in the local area network may broadcast the topology information and the uplink status of the router in the local area network. For example, each router in the local area network may broadcast the topology information and the uplink status of the router in the local area network when accessing the local area network. For example, each router in the local area network may alternatively periodically broadcast the topology information and the uplink status of the router in the local area network. For example, each router in the local area network may alternatively broadcast the topology information and the uplink status of the router in the local area network when the topology information or the uplink status of the router changes.

In this way, the first router can obtain the topology information and the uplink status of each router in the local area network, and periodically update the stored topology information and uplink status of each router in the local area network.

It may be understood that a connection between the routers in the local area network may be in a reachable state and an unreachable state. For example, if the secondary router 4 determines that a connection between the secondary router 4 and the secondary router 1 is in the reachable state, it is determined that the secondary router 1 is reachable. If the secondary router 4 determines that the connection between the secondary router 4 and the secondary router 1 is in an unreachable state, it is determined that the secondary router 1 is unreachable. The first router stores topology information and an uplink status of each reachable router in the local area network. If a router exits the local area network, or a connection between the first router and a router is interrupted, the first router determines that the router is unreachable. When updating the stored topology information and uplink status of each router in the local area network, the first router deletes the stored topology information and uplink status of the router.

S602: The first router determines a packet load balancing rule on the first router based on the topology information and the uplink status of each router in the local area network.

The packet load balancing rule on the first router is a rule for distributing, on the first router, a packet to the first router and a neighboring node of the first router. The neighboring node of the first router is a router directly connected to the first router.

The first router determines a quantity of neighboring nodes of the first router and a quantity of reachable nodes of each neighboring node based on the topology information and the uplink status of each router in the local area network. In this embodiment of this application, the quantity of reachable nodes of each neighboring node of the first router is a quantity of nodes that are reachable to the neighboring node and that do not include the first router. It should be noted that, in this embodiment of this application, the neighboring node is also included in the quantity of reachable nodes of the neighboring node.

In an implementation, when the quantity of neighboring nodes and the quantity of reachable nodes of each neighboring node are calculated, a router whose uplink status is unreachable is not counted.

For example, the first router is the secondary router 2 in FIG. 4. The secondary router 2 includes two neighboring nodes: the secondary router 5 and the primary router. A reachable node of the secondary router 5 includes a secondary router 5, and a quantity of reachable nodes of the secondary router 5 is 1. Reachable nodes of the primary router include the primary router, the secondary router 1, the secondary router 3, the secondary router 4, the secondary router 6, and the secondary router 7. A quantity of reachable nodes of the primary router is 6.

In an implementation, when the quantity of reachable nodes of each neighboring node is calculated, a router whose quantity of forwarding hops between the first router and the router is greater than a first preset value is not counted. For example, the first preset value is 3. If a quantity of forwarding hops between the secondary router 6 and the secondary router 2, and a quantity of forwarding hops between the secondary router 7 and the secondary router 2 are greater than the first preset value 3, the secondary router 6 and the secondary router 7 are not counted in the quantity of reachable nodes of the primary router. That is, the reachable nodes of the primary router include the primary router, the secondary router 1, the secondary router 3, and the secondary router 4. The quantity of reachable nodes of the primary router is 4.

Further, the first router determines that the quantity of neighboring nodes of the first router is M, and a quantity of reachable nodes of the $i^{th}$ neighboring node is $N_i$, where M>0, M≥i>0, and $N_i$>0. The packet load balancing rule on the first router is:

The first router sends $1/(N_1+N_2+\ldots N_i+\ldots N_{M+1})$ of a packet received by the first router to the external network; and the first router sends $N_i/(N_1+N_2+\ldots N_i+\ldots N_{M+1})$ of the packet received by the first router to the $i^{th}$ neighboring node.

For example, a quantity M of neighboring nodes of the secondary router 2 is 2, a quantity $N_1$ of reachable nodes of the first neighboring node (the secondary router 5) is 1, and a quantity $N_2$ of reachable nodes of the second neighboring node (the primary router) is 4. The secondary router 2 directly sends 1/(1+4+1) of a packet received by the secondary router 2 to the mobile network device 200 that is connected to the secondary router 2, sends 1/(1+4+1) of the packet received by the secondary router 2 to the secondary 5, and sends 4/(1+4+1) of the packet received by the secondary router 2 to the primary router.

S603: The first router receives a packet.

The first router may receive a packet from a terminal device that is connected to the first router.

The first router may further receive a packet from a neighboring node of the first router.

S604: The first router determines a destination router of the packet according to the packet load balancing rule on the first router.

After receiving the packet, the first router determines the destination router of the received packet according to the packet load balancing rule on the first router. The destination router may include the first router and a second router, and the second router is a neighboring node router of the first router.

For example, after receiving the packet, the secondary router 2 determines that a destination router of the 1/(1+4+1) of the packet is the secondary router 2, a destination router of the 1/(1+4+1) of the packet is the secondary router 5, and a destination router of the 4/(1+4+1) of the packet is the primary router.

In an implementation, the first router may store and update traffic of the packet that has been sent by the first router to the first router and each second router. For example, after sending a packet to the first router or the second router each time, the first router updates the traffic of the packet that is stored in the first router and that has been sent to the first router and each second router. After receiving a packet each time, the first router determines a destination router of the packet according to the packet load balancing rule on the first router based on the traffic of the packet that has been sent by the first router to the first router and each second router.

For example, the first router is the secondary router 2, and neighboring nodes of the secondary router 2 are the secondary router 5 and the primary router. According to a packet load balancing rule on the secondary router 2, a ratio of packets sent by the secondary router 2 to the secondary router 2, the secondary router 5, and the primary router is 1:1:4, and a ratio of packets that are stored by the secondary router 2 and that have been sent to the secondary router 2, the secondary router 5, and the primary router is 1:1:3.

Therefore, after receiving the packet, the secondary router 2 determines that the destination router of the packet is the primary router.

In an implementation, the first router may distribute the received packet based on a session. One session is an Internet Protocol (internet protocol, IP) quintuple. That is, packets with a same IP quintuple are considered as a session. The IP quintuple includes a source IP address, a source port, a destination IP address, a destination port, and a Transport Layer Protocol.

A session is established. That is, the first router receives one unit of packets. The first router determines a destination router of the session according to the packet load balancing rule on the first router based on traffic of the session that has been sent by the first router to the first router and each second router.

For example, after the $p^{th}$ session is established, a total quantity of sessions on the first router is p. A quantity of sessions that are stored by the first router and that have been sent to the first router is $q_0$, and a quantity of sessions that have been sent to the $i^{th}$ second router is $q_i$. The first router calculates a first difference between $(q_0+1)/p$, $(q_i+1)/p$, and $(q_0+1)/p$ and $1/(N_1+N_2+\ldots N_i+\ldots N_{M+1})$, and a second difference between $(q_i+1)/p$ and $N_i/(N_1+N_2+\ldots N_i+\ldots N_{M+1})$. If the first difference is less than or equal to each second difference, a destination router of the $p^{th}$ session is the first router. If the $i^{th}$ second difference is less than or equal to the first difference and another second difference, the destination router of the $p^{th}$ session is the $i^{th}$ second router. Further, when the $p^{th}$ session is closed, the first router may update stored values of p, $q_0$, and $q_i$.

In another implementation, the first router may distribute the received packet based on a destination IP address of a packet. That is, packets with a same destination IP address are considered as a unit.

For example, according to a packet load balancing rule on the secondary router 2, a ratio of packets sent by the secondary router 2 to the secondary router 2, the secondary router 5, and the primary router is 1:1:4. The secondary router 2 determines that a destination router of a packet whose destination IP address is IP 1 is the secondary router 2, determines that a destination router of a packet whose destination IP address is IP 2 is the secondary router 5, and determines that a destination router of packets whose destination IP addresses are IP 3, IP 4, IP 5, and IP 6 is the primary router.

In some embodiments, the first router separately calculates traffic of a first packet received from the terminal device that is connected to the first router and traffic of a second packet received from a neighboring node of the first router. That is, the first router distributes the received first packet according to the packet load balancing rule on the first router. The first router distributes the received second packet according to the packet load balancing rule on the first router. The first packet and the second packet are separately load-balanced on each router.

It should be noted that, when a second packet received from the second router is distributed, a destination router to which the packet is sent does not include the second router that sends the second packet. That is, when the destination router of the second packet is determined, the second router that sends the second packet is not counted. In an implementation, when the quantity of neighboring nodes of the first router is calculated in S602, if the first router determines that the received packet is from a third router, the third router is not counted in the neighboring nodes of the first router. The third router is a second router. That is, the third router is one of the neighboring nodes of the first router. For example, neighboring nodes of the secondary router 2 are the secondary router 5 and the primary router. The secondary router 2 receives a second packet sent by the secondary router 5. When a destination router of the second packet is determined, and when a quantity of neighboring nodes of the secondary router 2 is calculated, the secondary router 5 is not counted in the neighboring nodes of the secondary router 2. That is, the determined destination routers are the secondary router 2 and the primary router. This can avoid loops causing a packet to be forwarded cyclically between routers.

In an implementation, after receiving a second packet from the second router, if the first router determines that a quantity of forwarding hops of the packet between the routers is greater than or equal to the first preset value, the first router determines that a destination router of the packet is the first router. That is, the first router directly sends the packet to the external network, and does not distribute the packet according to the foregoing packet load balancing rule. For example, the first router is the secondary router 2, and the first preset value is 3. The secondary router 2 determines that the received packet is sent by the terminal device connected to the secondary router 4, where the packet is forwarded to the secondary router 2 through the secondary router 4, the secondary router 1, and the primary router, and the quantity of forwarding hops is 3. The secondary router 2 directly sends the packet to the external network, and no longer forwards the packet to another router.

In some embodiments, the first router may separately distribute packets of different service types. For example, a destination router of a packet of a delay-sensitive service is determined as the first router. That is, after receiving the packet belonging to the delay-sensitive service, the first router directly sends the packet to the external network. This can reduce a delay of sending the packet of the delay-sensitive service. For example, a packet of a high-bandwidth service may be distributed according to the packet load balancing rule on the first router. In this way, the high-bandwidth service can use bandwidths of the plurality of routers to obtain a high download rate. For example, the delay-sensitive service may include in-time response services such as a real-time game service, an audio call, a video call, and a live broadcast service. The high-bandwidth service may include a video on demand service, a large file download service, an augmented reality (AR)/virtual reality (VR) interactive service, and the like.

After receiving a packet, if the first router determines that a destination router of the packet is the first router, S605 in which the first router directly sends the packet to the external network is performed. If the first router determines that the destination router of the packet is the second router, S606 in which the first router sends the packet to the second router is performed.

S605: The first router directly sends the packet to the external network.

In the local area network in the tree networking of the distributed routers, when each terminal device connected to the local area network sends a packet, a destination media access control (MAC) address of the packet is a MAC address of the primary router.

After receiving the packet, if the first router determines that a destination router of the packet is the first router, the first router modifies the destination MAC address of the packet to a MAC address of the first router.

The first router directly sends a packet whose destination MAC address is the first router to the external network. In an example, a source IP address of the packet sent by the terminal device is an IP address allocated to the terminal device in the local area network. For example, the primary router may allocate an IP address in the local area network to each terminal device that is connected to the primary router and each secondary router in the local area network. After receiving the packet, the first router translates a source IP address of the packet into an Internet global IP address. This can implement communication between the terminal device and the Internet, to send the packet to the Internet.

S606: The first router sends the packet to the second router.

After receiving the packet, if the first router determines that the destination router of the packet is the second router, the first router modifies a destination MAC address of the packet to a MAC address of the second router. In this way, the packet may be sent to the second router.

According to the foregoing method, the packets received by the first router are distributed to the external network and each neighboring node (the second router) of the first router according to the packet load balancing rule on the first router. Further, a quantity of neighboring nodes of the $i^{th}$ neighboring node of the first router and a quantity of reachable nodes of each neighboring node of the $i^{th}$ neighboring node may be also determined. After receiving the packet from the first router, the $i^{th}$ neighboring node distributes the packet received from the first router to the external network and each neighboring node of the $i^{th}$ neighboring node according to a packet load balancing rule on the $i^{th}$ neighboring node. In this way, the packet received by the first router may be sent by the plurality of routers in the local area network to the external network, to implement packet load balancing between the routers in the local area network.

Figure 7A:
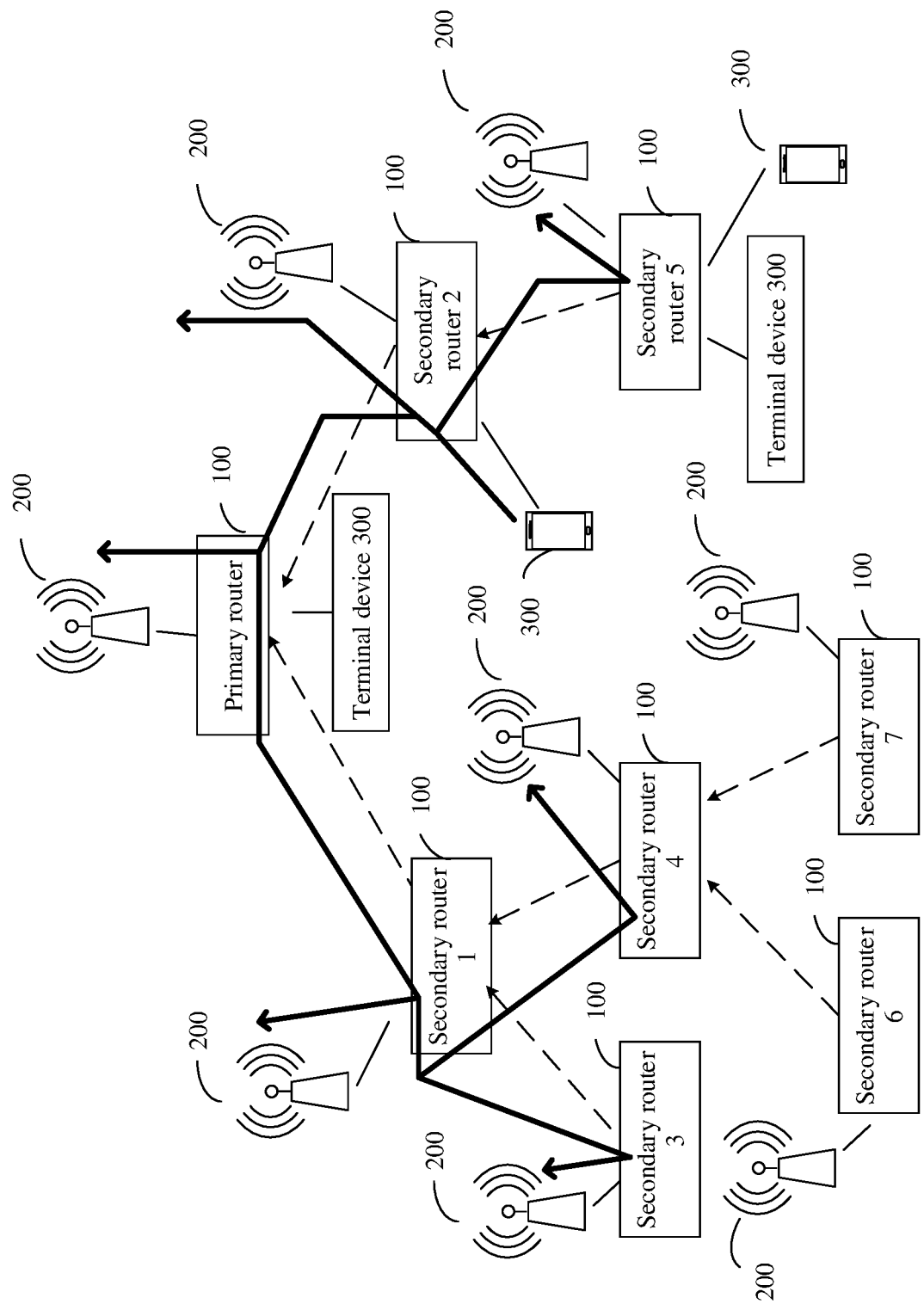
FIG. 7A is a schematic diagram 1 of a packet sending method in distributed router networking according to an embodiment of this application.

For example, as shown in FIG. 7A, the first router is the secondary router 2, and packets sent by a terminal device 300 that is connected to the secondary router 2 may be load-balanced by the secondary router 2, the secondary router 5, the primary router, the secondary router 1, the secondary router 3, and the secondary router 4, and are distributed to the external network.

Figure 7B:
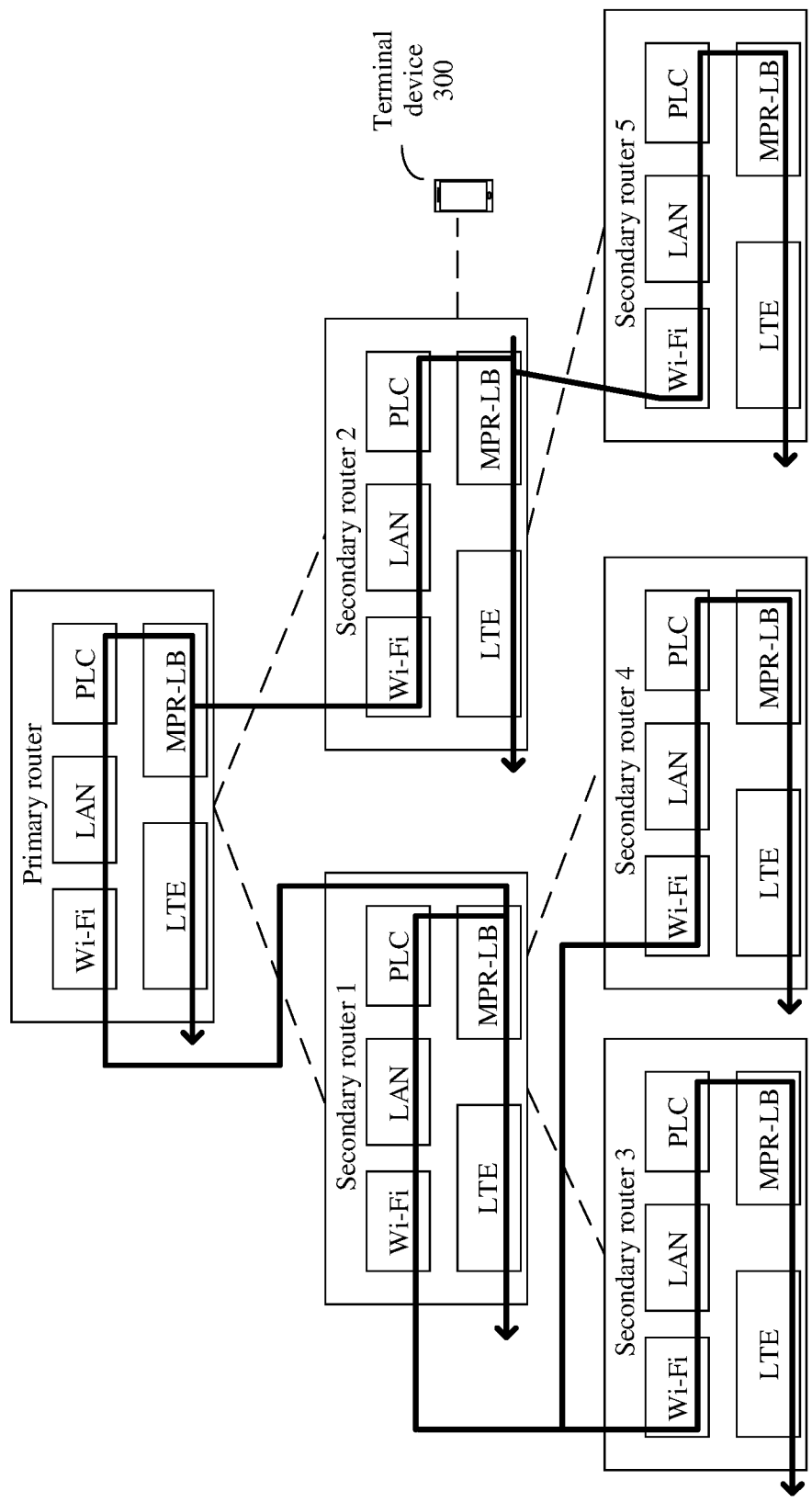
FIG. 7B is a schematic diagram 2 of a packet sending method in distributed router networking according to an embodiment of this application.

Further refer to FIG. 7B. The secondary router 2, the secondary router 5, the primary router, the secondary router 1, the secondary router 3, and the secondary router 4 each include an MPR-LB module, an LTE module, a Wi-Fi module, a LAN module, and a PLC module. The MPR-LB module is configured to provide functions such as load balancing and route management on the router. For example, the MPR-LB module may be the MPR-LB module 104 in FIG. 3B or the MPR-LB in FIG. 5. The LTE module is configured to provide an LTE access function for the router, and implement communication between the router and a mobile network. For example, the LTE module may be the mobile communication module 101 in FIG. 3B. The Wi-Fi module is configured to provide a Wi-Fi function for the router. For example, the Wi-Fi module may be the wireless communication module 102 in FIG. 3B, and may implement functions of the AP module, the AP' module, and the STA module in FIG. 5. The LAN module and the PLC module are configured to provide a wired connection function for the router. For example, the LAN module or the PLC module may implement a function of the wired communication module 103 in FIG. 3B. The terminal device 300 is connected to the secondary router 2. The MPR-LB module of the router 2 performs load balancing on a packet sent by the terminal device 300. The MPR-LB module of the secondary router 2 determines, according to the packet load balancing rule, that the secondary router 2 directly sends 1/(1+4+1) of the packet to the mobile network, sends 1/(1+4+1) of the packet to the secondary router 5, and sends 4/(1+4+1) of the packet to the primary router. The packet directly sent by the secondary router 2 to the mobile network is sent to the mobile network through the LTE module of the secondary router 2. The secondary router 2 sends 1/(1+4+1) of the packet to the secondary router 5, and sends 4/(1+4+1) of the packet to the primary router through the Wi-Fi module, the LAN module, or the PLC module.

The secondary router 5 receives, through the Wi-Fi module, the LAN module, or the PLC module, the packet sent by the secondary router 2. The MPR-LB module of the secondary router 5 determines, according to the packet load balancing rule, that the secondary router 5 directly sends the packet to the mobile network. Then, the packet is sent to the mobile network through the LTE module of the router 5.

The primary router receives, through the Wi-Fi module, the LAN module, or the PLC module, the packet sent by the secondary router 2. The MPR-LB module of the primary router determines, according to the packet load balancing rule, that the primary router directly sends 1/(1+3) of the received packet (that is, ⅙ of the packet sent by the terminal device 300) to the mobile network, and sends 3/(1+3) of the received packet to the secondary router 1. The packet directly sent by the primary router to the mobile network is sent to the mobile network through the LTE module of the primary router. The primary router sends 3/(1+3) of the received packet to the secondary router 1 through the Wi-Fi module, the LAN module, or the PLC module.

The secondary router 1 receives, through the Wi-Fi module, the LAN module, or the PLC module, the packet sent by the primary router. The MPR-LB module of the secondary router 1 determines, according to the packet load balancing rule, that the secondary router 1 directly sends 1/(1+1+1) of the received packet (that is, ⅙ of the packet sent by the terminal device 300) to the mobile network, sends 1/(1+1+1) of the received packet to the secondary router 3, and sends 1/(1+1+1) of the received packet to the secondary router 4. The packet directly sent by the secondary router 1 to the mobile network is sent to the mobile network through the LTE module of the secondary router 1. The secondary router 1 sends 1/(1+1+1) of the received packet to the secondary router 3, and sends 1/(1+1+1) of the received packet to the secondary router 4 through the Wi-Fi module, the LAN module, or the PLC module.

The secondary router 3 receives, through the Wi-Fi module, the LAN module, or the PLC module, the packet sent by the secondary router 1. The MPR-LB module of the secondary router 3 determines, according to the packet load balancing rule, that the secondary router 3 directly sends the packet to the mobile network. Then, the packet is sent to the mobile network through the LTE module of the router 3.

The secondary router 4 receives, through the Wi-Fi module, the LAN module, or the PLC module, the packet sent by the secondary router 1. The MPR-LB module of the secondary router 4 determines, according to the packet load balancing rule, that the secondary router 4 directly sends the packet to the mobile network. Then, the packet is sent to the mobile network through the LTE module of the router 4.

In this way, the packet sent by the terminal device 300 that is connected to the secondary router 2 is load-balanced by the secondary router 2, the secondary router 5, the primary router, the secondary router 1, the secondary router 3, and the secondary router 4, and is distributed to the external network.

In some embodiments, a packet returned from the external network is returned through an original channel through which the packet is sent. For example, a packet sent by the terminal device 300 is forwarded by the secondary router 2 to the primary router, and then forwarded to the secondary router 1, and the secondary router 1 sends the packet to the external network. A packet returned from the external network to the terminal device 300 is received by the secondary router 1, forwarded to the primary router, forwarded to the secondary router 2, and then distributed to the terminal device 300. In an implementation, after receiving a packet from the external network, the secondary router 1 translates a destination IP address of the packet from an Internet global IP address into an IP address on the local area network. In this way, the packet can be distributed in the local area network.

If the terminal device simultaneously sends a packet to the external network through the plurality of routers, the terminal device can simultaneously download the packet from the external network through the plurality of routers. For example, a user can watch live broadcasts by using terminal devices such as a mobile phone and a television, and download videos through a plurality of lines of the plurality of routers at the same time. This ensures better bandwidth experience.

According to the packet sending method in distributed router networking provided in this embodiment of this application, each router in the local area network has a capability of communicating with the external network. The terminal device that is connected to the local area network can simultaneously send and receive a packet to the external network through the plurality of routers in the local area network. This implements bandwidth aggregation of the plurality of routers in the local area network, and improves overall bandwidth of a smart home system.

The following describes the packet sending method in distributed router networking provided in this embodiment of this application by using an example in which routers form a local area network in a mesh networking form.

Figure 8:
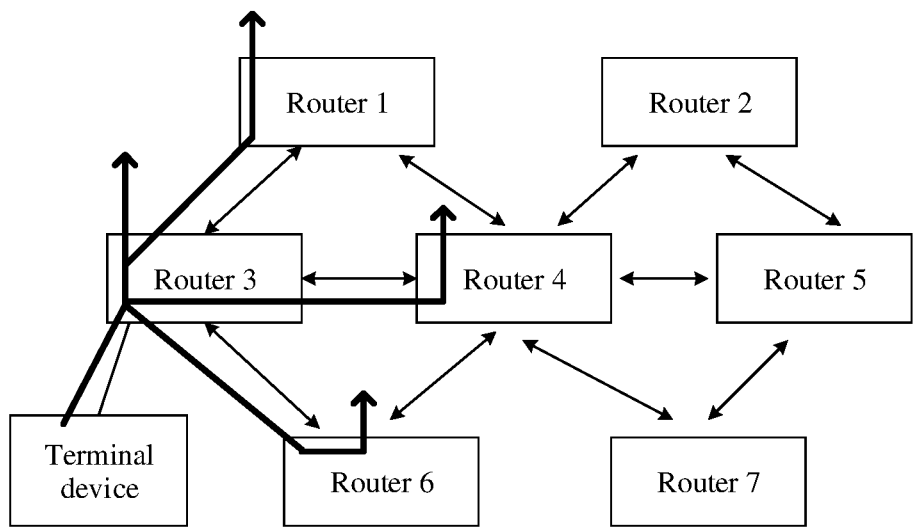
FIG. 8 is a schematic diagram 3 of a packet sending method in distributed router networking according to an embodiment of this application.

Refer to FIG. 8. For example, the first router is the router 3.

The router 3 obtains topology information and an uplink status of each router in the local area network.

The topology information of the router may include an identifier of a router directly connected to the router. For example, the topology information of the router 3 is the router 1, the router 4, and the router 6. The topology information of the router 1 is the router 3 and the router 4. The topology information of the router 4 is the router 1, the router 2, the router 3, the router 5, the router 6, and the router 7. The topology information of the router 6 is the router 3 and the router 4.

For example, the uplink status of each router in the local area network shown in FIG. 8 is reachable. For example, each router is connected to one CPE (which is not shown in FIG. 8), and an uplink between the router and the CPE is in the reachable state.

Each router in the local area network periodically broadcasts the topology information and the uplink status in the local area network. In this way, the router 3 can obtain the topology information and the uplink status of each router in the local area network.

The router 3 determines that neighboring nodes of the router 3 are the router 1, the router 4, and the router 6, and further determines a quantity of reachable nodes of each of the router 1, the router 4, and the router 6. For example, a first preset value is 1, and when a quantity of reachable nodes of a neighboring node is calculated, a router whose quantity of forwarding hops between the router and the router 3 is greater than 1 is not counted. In this case, the quantity of reachable nodes of each of the router 1, the router 4, and the router 6 is 1.

In a packet sent by the terminal device that is connected to the router 3, the router 3 directly sends ¼ of the packet to the external network. The router 1 sends ¼ of the packet to the external network after the packet is forwarded to the router 1. The router 4 sends ¼ of the packet to the external network after the packet is forwarded to the router 4. The router 6 sends ¼ of the packet to the external network after the packet is forwarded to the router 6. A packet returned from the external network is returned through an original channel through which the packet is sent. In this way, the terminal device connected to the router 3 may download a service by using bandwidths of the router 3, the router 1, the router 4, and the router 6. This implements bandwidth aggregation, and improves a download rate.

It may be understood that to implement the foregoing functions, the router includes corresponding hardware structures and/or software modules for performing the functions. A person skilled in the art should be easily aware that, in combination with units and algorithm steps of the examples described in the embodiments disclosed in this specification, the embodiments of this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

In the embodiments of this application, the router may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in the embodiments of this application, division into the modules is an example, and is merely a logical function division. During actual implementation, another division manner may be used.

Figure 9:
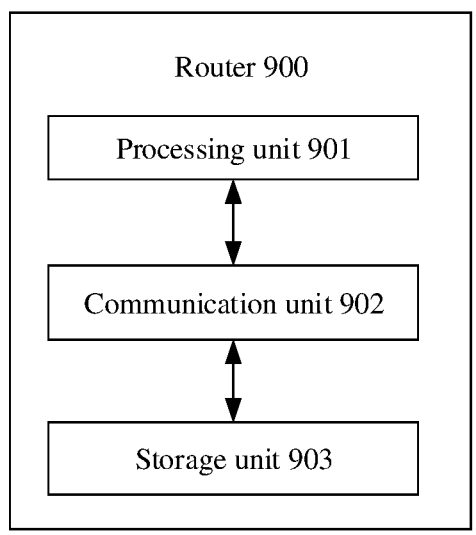
FIG. 9 is a schematic diagram 3 of a structure of a router according to an embodiment of this application.

When an integrated unit is used, FIG. 9 is a schematic diagram of a possible structure of a router in the foregoing embodiments. A router 900 includes a processing unit 901, a communication unit 902, and a storage unit 903. The processing unit 901 is configured to control and manage an action of the router 900. The communication unit 902 is configured to support communication between the router 900 and another network entity. The storage unit 903 stores instructions and data of the router 900. The instructions may be used to perform the steps in FIG. 6 and the corresponding embodiments.

Certainly, unit modules in the router 900 include but are not limited to the processing unit 901, the communication unit 902, and the storage unit 903. For example, the router 900 may further include a power supply unit, and the like. The power supply unit is configured to supply power to the router 900.

The processing unit 901 may be a processor or a controller, for example, may be a central processing unit (CPU), a digital signal processor (DSP), an application-specific integrated circuit (ASIC), a field programmable gate array (FPGA) or another programmable logic device, a transistor logic device, a hardware component, or any combination thereof. The communication unit 902 may be a transceiver, a transceiver circuit, or the like. The storage unit 903 may be a memory.

For example, the processing unit 901 is a processor (the processor 110 shown in FIG. 3A), the communication unit 902 may be referred to as a communication interface (the communication line 120 shown in FIG. 3A), and the storage unit 903 may be a memory (the memory 130 shown in FIG. 3A). The router 900 provided in this embodiment of this application may be the router 100 shown in FIG. 3A. The processor, the memory, the communication interface, and the like may be connected together, for example, through a bus.

An embodiment of this application further provides a computer storage medium. The computer storage medium stores computer program code. When a processor executes the computer program code, a router performs the method in the foregoing embodiments.

An embodiment of this application further provides a computer program product. When the computer program product runs on a computer, the computer is enabled to perform the method in the foregoing embodiments.

The router 900, the computer storage medium, or the computer program product provided in the embodiments of this application are all configured to perform the corresponding methods provided above. Therefore, for beneficial effects that can be achieved thereof, refer to the beneficial effects in the corresponding methods provided above. Details are not described herein again.

The foregoing descriptions about implementations allow a person skilled in the art to clearly understand that, for the purpose of convenient and brief description, division of the foregoing function modules is taken as an example for illustration. During actual application, the foregoing functions can be allocated to different modules and implemented according to requirements, that is, an inner structure of an apparatus is divided into different function modules to implement all or some of the functions described above.

In the several embodiments provided in this application, it should be understood that the disclosed apparatus and method may be implemented in other manners. For example, the described apparatus embodiments are merely examples. For example, division into the modules or units is merely logical function division, and may be other division during actual implementation. For example, a plurality of units or components may be combined or may be integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software functional unit and sold or used as an independent product, the integrated unit may be stored in a readable storage medium. Based on such an understanding, the technical solutions of this application essentially, or the part contributing to the current technology, or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in the embodiments of this application. The foregoing storage medium includes: any medium that can store program code, such as a USB flash drive, a removable hard disk, a ROM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:
   receiving packets, by a first router, wherein the first router is a router of at least two routers in a same local area network, and each router of the at least two routers is configured to communicate with an external network;
   determining, by the first router, at least two destination routers to transmit the packets according to a packet load balancing rule, wherein the at least two destination routers comprise the first router and a second router, and wherein the second router is a neighboring node router of the first router, and the neighboring node router of the first router is a router directly connected to the first router;
   determining, by the first router, a quantity of neighboring nodes of the first router;
   determining, by the first router, a number of reachable nodes for each of the neighboring nodes; and
   determining, by the first router, that the packet load balancing rule is:
   the first router sends a first portion of the packets received by the first router to the external network, and
   the first router sends the remaining packets to the neighboring nodes, wherein a number of remaining packets sent to each neighboring node is proportional to its respective determined number of reachable nodes.

2. The method according to claim 1, further comprising:
   obtaining, by the first router, topology information and an uplink status of each router of the at least two routers, wherein the topology information of each router indicates a connection relationship between the respective router and another router in the local area network, and the uplink status of each router is a status of an uplink between the respective router and the external network; and
   determining, by the first router, the packet load balancing rule based on the topology information and the uplink status of each router of the at least two routers.

3. The method according to claim 2, wherein determining, by the first router, the packet load balancing rule based on the topology information and the uplink status of each router of the at least two routers comprises:
   determining, by the first router, a quantity M of neighboring nodes of the first router, and for each value of i from 1 to M, determining a quantity $N_i$ of reachable nodes of the $i^{th}$ neighboring node based on the topology information and the uplink status of each router of the at least two routers, wherein M>0, and $N_i$>0; and determining, by the first router, that the packet load balancing rule is:
the first router sends $1/(N_1+N_2+ \ldots N_i+ \ldots N_{M+1})$ of the packets received by the first router to the external network; and
for each value of i from 1 to M, the first router sends $N_i/(N_1+N_2+ \ldots N_i+ \ldots N_{M+1})$ of the packets received by the first router to the $i^{th}$ neighboring node.

4. The method according to claim 3, wherein the packets received by the first router are from a third router, wherein the third router is the neighboring node of the first router, and the third router is not comprised in the M neighboring nodes of the first router when determining, by the first router, the packet load balancing rule.

5. The method according to claim 1, further comprising sending, by the first router, the packets to at least one of the at least two destination routers by:
sending, by the first router, the packets to the at least one of the at least two destination routers based on a session according to the packet load balancing rule; or
sending, by the first router, the packets to the at least one of the at least two destination routers based on a destination internet protocol (IP) address of each of the packets according to the packet load balancing rule.

6. The method according to claim 1, wherein the packets comprise a first packet and a second packet, the first packet is received by the first router from a terminal device that is connected to the first router, and the second packet is received by the first router from a neighboring node of the first router; and
wherein the method further comprises:
separately determining, by the first router, the packet load balancing rule on the first router for each of the first packet and the second packet.

7. The method according to claim 6, wherein a quantity of forwarding hops of the second packet between the at least two routers in the local area network is greater than or equal to a first preset value, and a destination router of the second packet is the first router.

8. The method according to claim 1, wherein the packets comprise a packet of a delay-sensitive service, and a destination router of the packet of the delay-sensitive service is the first router.

9. The method according to claim 1, wherein the destination router comprises the first router, and the method further comprises:
sending, by the first router, the packets to the external network.

10. The method according to claim 1, wherein the local area network is in a tree networking form, a mesh networking form, a star networking form, or a chain networking form.

11. A first router, comprising:
at least one transceiver, configured to receive packets; and
a processor, configured to:
determine at least one destination router according to a packet load balancing rule;
determine at least two destination routers to transmit the packets according to the packet load balancing rule, wherein at least two routers are located in a same local area network, each router of the at least two routers is configured to communicate with an external network, the at least two routers comprise the first router, wherein the at least two destination routers comprise the first router and a second router, and wherein the second router is a neighboring node router of the first router, and the neighboring node router of the first router is a router directly connected to the first router;
determine a quantity of neighboring nodes of the first router;
determine a number of reachable nodes for each of the neighboring nodes; and
determine that the packet load balancing rule is:
the first router sends a first portion of the packets received by the first router to the external network, and
the first router sends the remaining packets to the neighboring nodes, wherein a number of remaining packets sent to each neighboring node is proportional to its respective determined number of reachable nodes.

12. The first router according to claim 11, wherein the processor is further configured to:
obtain topology information and an uplink status of each router of the at least two routers, wherein the topology information of the each router indicates a connection relationship between the respective router and another router in the local area network, and the uplink status of each router is a status of an uplink between the respective router and the external network; and
determining the packet load balancing rule based on the topology information and the uplink status of each router of the at least two routers.

13. The first router according to claim 12, wherein determining the packet load balancing rule based on the topology information and the uplink status of each router of the at least two routers comprises:
determining a quantity M of neighboring nodes of the first router, and for each value of i from 1 to M, determining a quantity $N_i$ of reachable nodes of the $i^{th}$ neighboring node based on the topology information and the uplink statuses of each router of the at least two routers, wherein M>0, and $N_i$>0; and
determining that the packet load balancing rule is:
$1/(N_1+N_2+ \ldots N_i+ \ldots N_{M+1})$ of the packets received by the first router are sent to the external network; and
for each value of i from 1 to M, $N_i/(N_1+N_2+ \ldots N_i+ \ldots N_{M+1})$ of the packets received by the first router are sent to the $i^{th}$ neighboring node.

14. The first router according to claim 11, wherein determining the at least one destination router according to the packet load balancing rule comprises:
determining the at least one destination router based on a session according to the packet load balancing rule; or
determining the at least one destination router based on a destination internet protocol (IP) address of a packet according to the packet load balancing rule.

15. The first router according to claim 11, wherein the packets comprises a first packet and a second packet, the first packet is received by the first router from a terminal device that is connected to the first router, and the second packet is received by the first router from a neighboring node of the first router; and
wherein the processor is further configured to:
separately determine the packet load balancing rule on the first router for the first packet and the second packet.

16. The first router according to claim 15, wherein a quantity of forwarding hops of the second packet between the at least two routers in the local area network is greater than or equal to a first preset value, and a destination router of the second packet is the first router.

17. The first router according to claim 11, wherein the packets comprise a packet of a delay-sensitive service, and a destination router of the packet of the delay-sensitive service is the first router.

18. The first router according to claim 11, wherein the at least one destination router comprises the first router, the at least one transceiver is further configured to:
send the packets to the external network.

19. The first router according to claim 11, wherein the local area network is in a tree networking form, a mesh networking form, a star networking form, or a chain networking form.

20. A non-transitory computer readable medium with instructions stored thereon, wherein, when the instructions are executed by a computer, the instructions cause the computer to:
receive packets, wherein the computer is applied to a first router, the first router is a router of at least two routers in a same local area network, and each router of the at least two routers is configured to communicate with an external network;
determine at least two destination routers to transmit the packets according to a packet load balancing rule, wherein the at least two destination routers comprise the first router and a second router, and wherein the second router is a neighboring node router of the first router, and the neighboring node router of the first router is a router directly connected to the first router;
determine a quantity of neighboring nodes of the first router;
determine a number of reachable nodes for each of the neighboring nodes; and
determine that the packet load balancing rule is:
the first router sends a first portion of the packets received by the first router to the external network, and
the first router sends the remaining packets to the neighboring nodes, wherein a number of remaining packets sent to each neighboring node is proportional to its respective determined number of reachable nodes.

* * * * *